United States Patent [19]
Tanaka et al.

[11] Patent Number: 5,363,652
[45] Date of Patent: Nov. 15, 1994

[54] AIR/FUEL RATIO CONTROL DEVICE OF A TURBOCHARGED ENGINE

[75] Inventors: Shigetaka Tanaka; Yukio Ohtake; Yutaka Ohbuchi, all of Susono, Japan

[73] Assignee: Toyota Jidosha Kabushiki Kaisha, Toyota, Japan

[21] Appl. No.: 77,224

[22] Filed: Jun. 14, 1993

[30] Foreign Application Priority Data

Jun. 24, 1992 [JP] Japan .................. 4-166192

[51] Int. Cl.$^5$ .................. F02B 37/12; B64C 11/30
[52] U.S. Cl. .................. 60/603; 60/605.1; 416/27
[58] Field of Search .................. 60/600, 601, 602, 603, 60/611; 123/564

[56] References Cited
U.S. PATENT DOCUMENTS

| | | | |
|---|---|---|---|
| 4,254,625 | 3/1981 | Bergstedt et al. | 60/602 |
| 4,270,356 | 6/1981 | Will et al. | 60/602 |
| 4,459,809 | 7/1984 | Tadokoro et al. | 60/602 |
| 4,626,170 | 12/1986 | Dorsch | 416/29 |
| 4,693,670 | 9/1987 | Hawener et al. | 416/25 |
| 4,873,961 | 10/1989 | Tanaka | 60/601 |
| 5,125,235 | 6/1992 | Yamagihara et al. | 60/611 |

*Primary Examiner*—Michael Koczo
*Attorney, Agent, or Firm*—Kenyon & Kenyon

[57] ABSTRACT

An engine including a supercharger wherein a waste gate valve is provided in the bypass passage bypassing the exhaust turbine of the supercharger and the supercharged pressure is controlled by the waste gate valve so that when the opening of the throttle valve provided in the intake duct falls under a set level, the air-fuel mixture is made lean and when it becomes greater than the set opening, the air-fuel mixture is made rich. When the air-fuel mixture is changed from a lean to rich mixture, the opening of the waste gate valve is made larger to reduce the supercharged pressure and thereby prevent abrupt fluctuations in the engine output.

11 Claims, 14 Drawing Sheets

AIR/FUEL RATIO CONTROL DEVICE OF A TURBOCHARGED ENGINE

BACKGROUND OF THE INVENTION

1. Field of the Invention

The present invention relates to an output power control device of an engine.

2. Description of the Related Art

In aircraft using reciprocating internal combustion engines to drive their propellers, the engines are driven at their maximum output during takeoff since the greatest propulsion is required at the time of takeoff. Once the aircraft switches to steady flight, however, the engines are driven at an output of about 80 percent of the maximum output, for example. During steady flight, the amount of fuel consumption is usually reduced by operating the engines using a lean air-fuel mixture. If, however, the engines are operated using the lean air-fuel ratio when maximum engine output is demanded, such as during takeoff, the cooling action of the fuel becomes insufficient, so the problem arises of overheating of the engine valve system and pistons.

There is known an internal combustion engine for aircraft use designed so that when a maximum output is demanded of an engine, the air-fuel mixture is made rich to improve the cooling action of the fuel and prevent overheating of the engine valve system and pistons and at the same time improve the maximum output of the engine (see U.S. Pat. No. 4,693,670). In this aircraft internal combustion engine, when a power lever provided at the pilot's seat is pushed in the direction of the engine maximum output and passes a certain position, the air-fuel mixture is switched from a lean mixture to a rich one.

However, when the air-fuel mixture was suddenly changed from a lean mixture to a rich mixture or from a rich mixture to a lean one at a certain position of the power lever, there was the problem of a shock due to the sudden change of the engine output. Further, if the engine output changes suddenly with respect to a position of the power lever in this way, the problem arises that the aircraft can not tail other aircraft well.

SUMMARY OF THE INVENTION

An object of the present invention is to provide an output control device capable of preventing the output power of an engine from abruptly fluctuating.

According to the present invention, there is provided a device for controlling an output power of an engine having a supercharger, the device including air-fuel ratio control means for controlling an air-fuel ratio of a mixture fed into the engine cylinders to make the air-fuel ratio of the mixture equal to a predetermined first air-fuel ratio when the engine is operating in a predetermined first operating state and make the air-fuel ratio of the mixture equal to a predetermined second air-fuel ratio which is smaller than the first air-fuel ratio when the engine is operating in a predetermined second operating state and supercharged pressure control means for controlling a supercharged pressure of air discharged from the supercharger and fed into the engine cylinders to make the supercharged pressure equal to a predetermined first supercharged pressure when the engine is operating in the first operating state and make the supercharged pressure equal to a predetermined second supercharged pressure which is lower than the first supercharged pressure when the engine is operating in the second operating state.

The present invention may be more fully understood from the description of the preferred embodiments of the invention set forth below together with the accompanying drawings.

DESCRIPTION THE PREFERRED EMBODIMENTS

Figure 1:
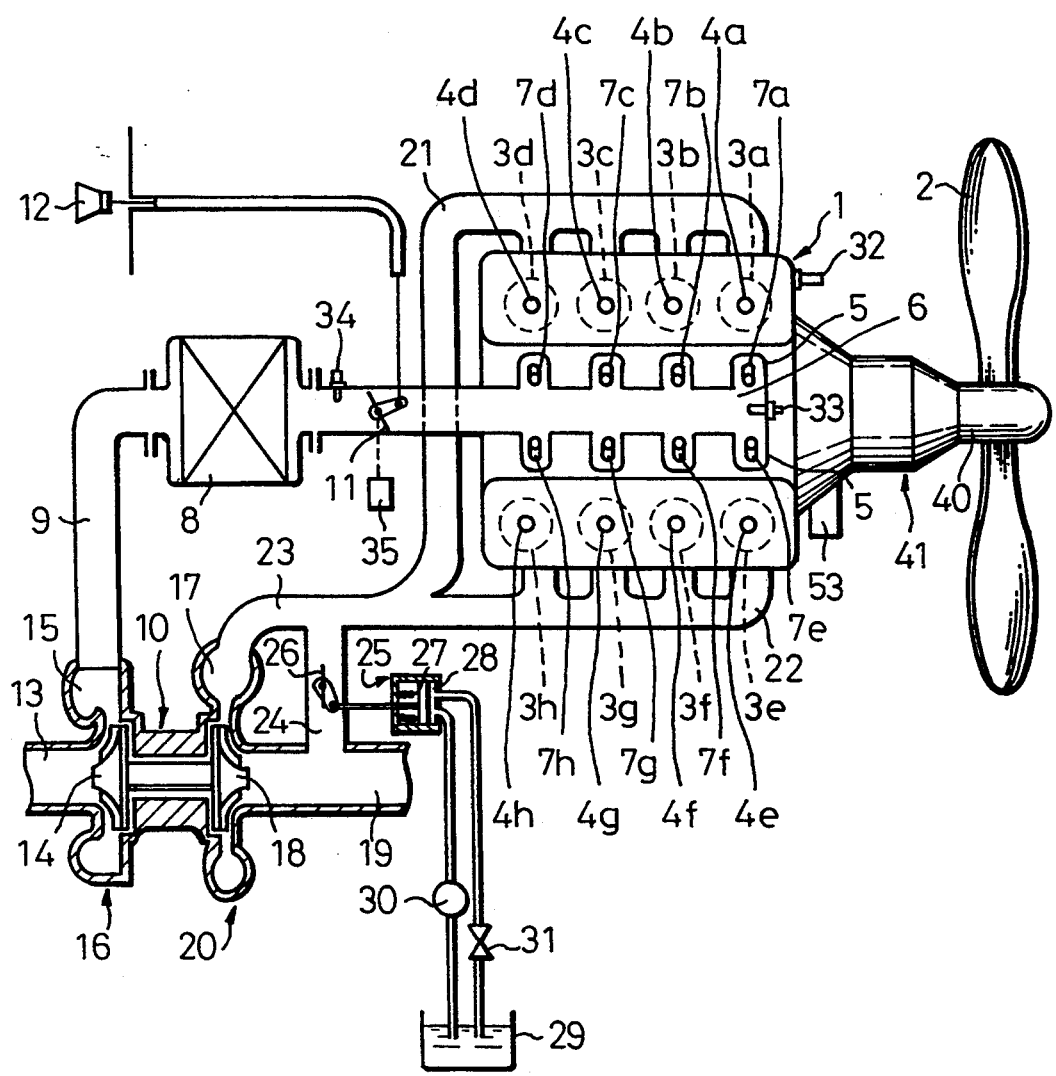
FIG. 1 is a plane view of an internal combustion engine shown schematically.

FIG. 1 shows a reciprocating internal combustion engine 1 for driving a propeller 2 of an aircraft. In the embodiment shown in FIG. 1, the internal combustion engine 1 is comprised of a spark ignition type 8-cylinder V-type internal combustion engine where the cylinders 3a, 3b, 3c, 3d, 3e, 3f, 3g, and 3h are respectively provided with spark plugs 4a, 4b, 4c, 4d, 4e, 4f, 4g, and 4h. Further, the cylinders 3a to 3h are connected to a common intake duct 6 through corresponding intake branch pipes 5. In the intake branch pipes 5 are arranged the fuel injectors 7a, 7b, 7c, 7d, 7e, 7f, 7g, and 7h. The intake duct 6 is connected to an exhaust turbocharger 10 through an intercooler 8 and an intake duct 9. In the intake duct 6 downstream of the intercooler 8 is disposed a throttle valve 11. The throttle valve 11 is connected to a throttle lever 12 provided at the pilot's seat.

The turbocharger 10 is comprised of a compressor including an air intake pipe 13, an impeller 14, and a compressor scroll chamber 15 and of an exhaust turbine 20 including a turbine scroll chamber 17, a turbine wheel 18, and an exhaust gas discharge pipe 19. The scroll chamber 15 of the compressor 16 is connected to the intake duct 9. On the other hand, the cylinders 3a, 3b, 3c, and 3d are connected to a common exhaust manifold 21, while the remaining cylinders 3e, 3f, 3g, and 3h are connected to a common exhaust manifold 22. These exhaust manifolds 21 and 22 are connected to a common exhaust pipe 23, which exhaust pipe 23 is connected to the scroll chamber 17 of the exhaust turbine 20. The turbine wheel 18 is made to turn by the exhaust gas discharged from the cylinders 3a to 3h. By this, the impeller 14 is made to turn. When this happens, the air raised in pressure by the compressor 16 is fed to the cylinders 3a to 3h through the intake duct 9, the intercooler 8, the intake duct 6, and the corresponding intake branch pipes 5.

On the other hand, an exhaust bypass pipe 24 is branched from the exhaust pipe 23. This exhaust bypass pipe 24 is connected to the exhaust gas discharge pipe 19. In the exhaust bypass pipe 24 is arranged a waste gate valve 26 controlled by an actuator 25. The actuator 25 is provided with a piston 27 connected to the waste gate valve 26 and an oil pressure chamber chamber 28 defined by the piston 27. Oil inside the oil tank 29 is supplied to the oil pressure chamber 28 by an oil pump 30 which is driven by the engine. The oil in the oil pressure chamber 28 is returned inside the oil tank 29 through a flow control valve 31.

In the embodiment shown in FIG. 1, the flow control valve 31 is comprised of a linear solenoid valve. The more the current supplied to the linear solenoid valve 31 falls, the smaller the opening of the linear solenoid valve 31 becomes. When the opening of the linear solenoid valve 31 becomes smaller, the amount of the oil returned from the oil pressure chamber 28 into the oil tank 29 falls, so the piston 27 moves to the left in FIG. 1 and as a result the opening of the waste gate valve 26 becomes smaller. When the opening of the waste gate valve 26 becomes smaller, the amount of the exhaust gas fed to the turbine wheel 18 increases, so the rotational speed of the turbine wheel 18 rises and as a result the air pressure in the intake duct 9, that is, the supercharged pressure, rises. Therefore, the less the current supplied to the linear solenoid valve 31, the more the supercharged pressure is raised, it was learned.

As shown in FIG. 1, a rotational speed sensor (hereinafter referred to as an NE sensor) 32 is attached to the engine body 1 for detecting the engine rotational speed NE. Further, a pressure sensor (hereinafter referred to as a PM sensor) 33 is attached inside the intake duct 6 downstream of the throttle valve 11 for detecting the pressure PM inside the intake duct 6. Still further, a pressure sensor (hereinafter referred to as a PD sensor) 34 is attached inside the intake duct 6 between the intercooler 8 and the throttle valve 11 so as to detect the deck pressure PD, that is, the supercharged pressure. Also, the throttle valve 11 has mounted in it an opening sensor (hereinafter referred to as a TA sensor) 35 for detecting the degree of opening TA of the throttle valve 11.

Figure 2:
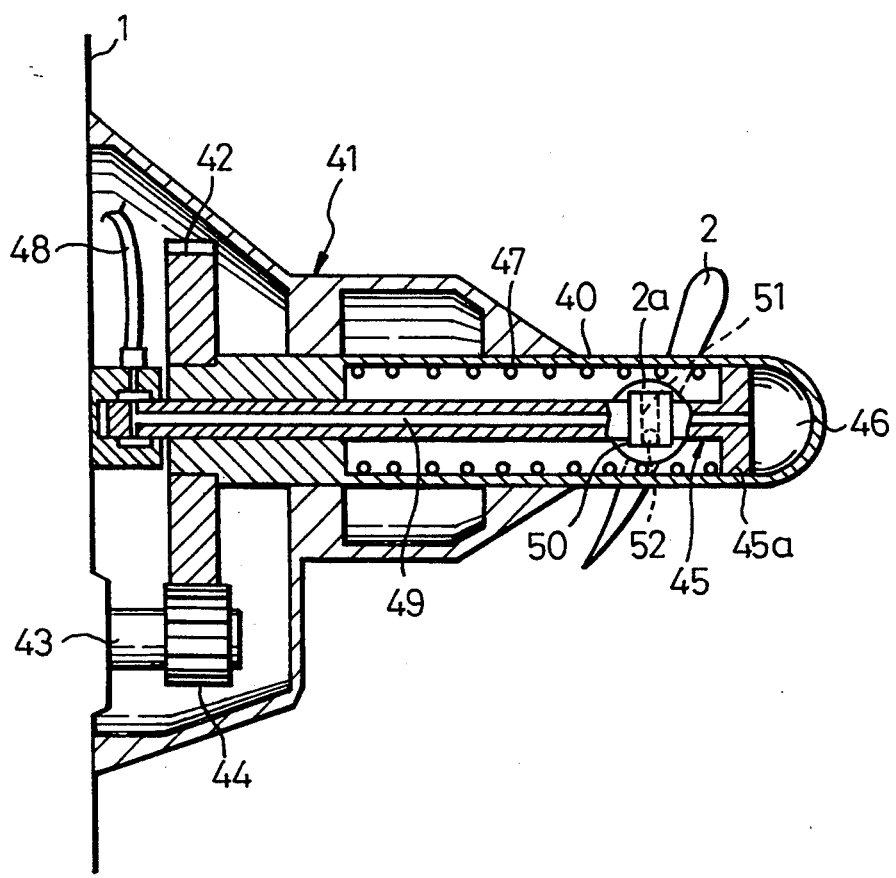
FIG. 2 is a side sectional view schematically showing the area around a propeller shaft.

As shown in FIG. 1, at the front of the engine body 1 there is attached a casing 41 which encloses the propeller shaft 40. FIG. 2 schematically shows the inside of the casing 41. Referring to FIG. 2, the propeller shaft 40 is rotatably supported in the casing 41. At the inside end of the propeller shaft 40 is affixed a large diameter gear 42. This large diameter gear 42 is engaged with a small diameter gear 44 affixed to a crankshaft 43 of the engine. Therefore, the crankshaft 43 is connected to the propeller shaft 40 through reduction gears comprised of the gears 42 and 44.

On the other hand, a piston 45 for controlling the propeller pitch is disposed in the propeller shaft 40. This piston 45 is disposed slidably in the axial direction inside the propeller shaft 40 and rotates with the propeller shaft 40. At the front end of the propeller shaft 40 there is formed an oil pressure chamber 46 defined by the expanded head 45a of the piston 45. In the propeller shaft 40 is inserted a compression spring 47 which biases the piston 45 toward the oil pressure chamber 46. Inside the oil pressure chamber 46 is supplied oil through an oil pressure conduit 48 and an oil pressure passage 49 in the piston 45. On the piston 45 is affixed a control rod 50 extending toward the root portion 2a of the propeller 2 in the direction perpendicular to the axial line of the piston 45. A groove 51 is formed in the front end face of the control rod 50. On the other hand, the root portion 2a of the propeller 2 is rotatably supported by the propeller shaft 40. At the root portion 2a of the propeller 2 is affixed a pin 52 which engages with the groove 51 at a position eccentric from the rotational axis of the root portion 2a. Therefore, if the piston 45 moves in the axial direction, the propeller 2 is rotated about the rotational axis of the propeller 2 and therefore the pitch angle of the propeller 2 is controlled by the piston 45. The amount of movement of the piston 2 is controlled by the amount of oil inside the oil pressure chamber 46. The amount of oil in the oil pressure chamber 46, on the other hand, is controlled by a propeller pitch control actuator 53 (FIG. 1).

Figure 3:
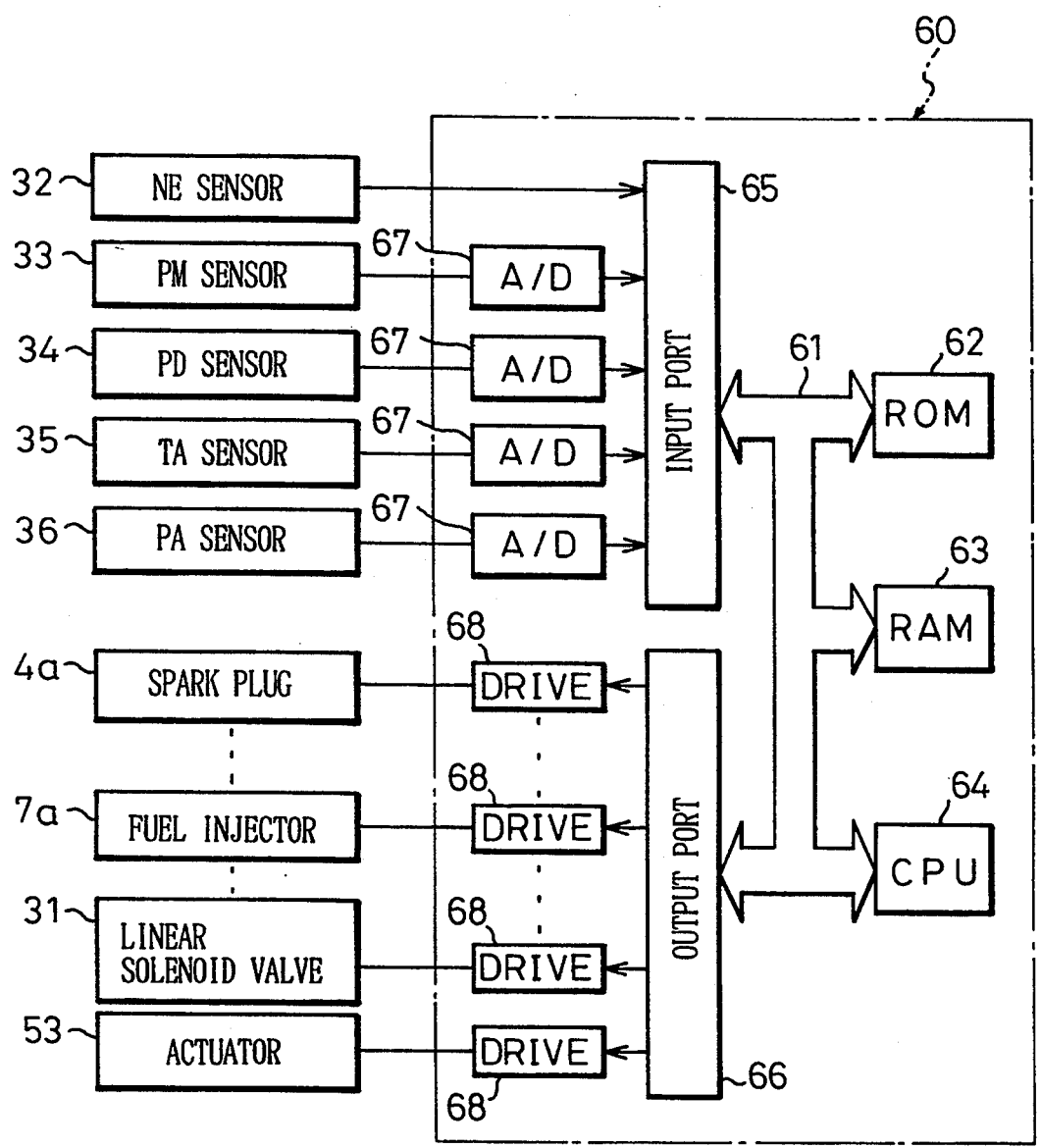
FIG. 3 is a view of an electronic control unit.

FIG. 3 shows an electronic control unit 60 for controlling the spark plugs 4a to 4h, the fuel injectors 7a to 7h, the linear solenoid valve 31 used for waste gate valve control, and the propeller pitch control actuator 53. As shown in FIG. 3, the electronic control unit 60 is comprised of a digital computer and is provided with a read only memory (ROM) 62, a random access memory (RAM) 63, a microprocessor (CPU) 64, an input port 65, and an output port 66, all connected with each other by a bidirectional bus 61.

The NE sensor 32 issues an output pulse each time the engine crankshaft 43 turns a predetermined crank angle. The output pulses of the NE sensor 32 are input to the input port 65. The engine rotational speed NE is calculated by the CPU 64 based on these output pulses. On the other hand, the PM sensor 33 issues an output voltage proportional to the absolute pressure PM in the intake duct 6 downstream of the throttle valve 11, while the PD sensor 34 issues an output voltage proportional to the absolute pressure (deck pressure) PD inside the intake duct 6 upstream of the throttle valve 11. Further, the TA sensor 35 issues an output voltage proportional to the opening TA of the throttle valve 11. Further, to detect the atmospheric pressure PA, an atmospheric pressure sensor (hereinafter referred to as a PA sensor) 36 is provided. The PA sensor 36 issues an output voltage proportional to the atmospheric pressure PA. The output voltages of the PM sensor 33, the PD sensor 34, the TA sensor 35, and the PA sensor 36 are input to the input port 65 through the corresponding AD converters 67. On the other hand, the output port 66 is connected to the spark plugs 4a to 4h, the fuel injectors 7a to 7h, the linear solenoid valve 31, and the actuator 53 through the corresponding drive circuits 68.

Figure 4:
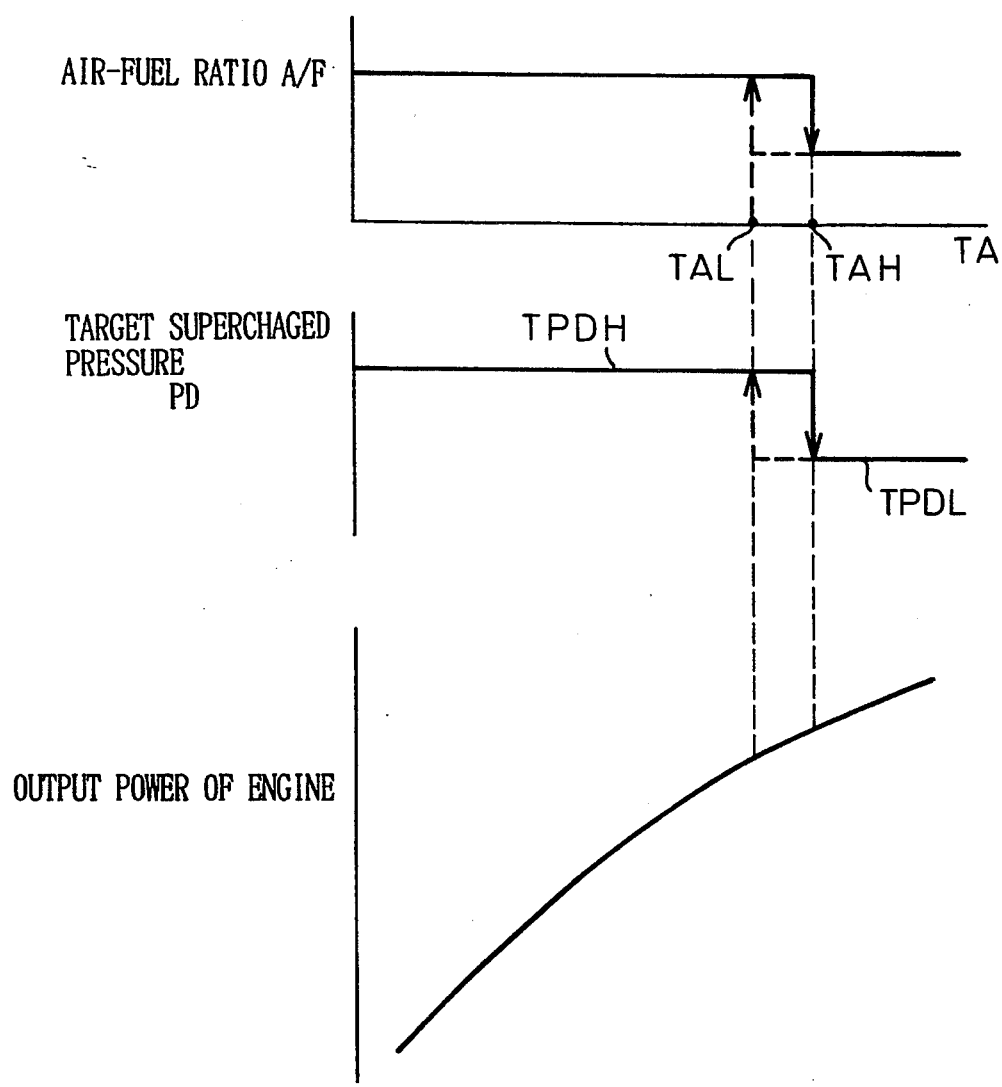
FIG. 4 is a graph of the relationship between the air-fuel ratio and the supercharged pressure.

FIG. 4 shows the relationship between the air-fuel ratio A/F and the supercharged pressure PD in the present invention. According to the present invention, as shown in FIG. 4, when the throttle opening TA is smaller than a set opening TAH, the air-fuel ratio A/F is made a large air-fuel ratio, that is, the air-fuel mixture is made lean, and the supercharged pressure PD is maintained at a relatively high target supercharged pressure TPDH. If the throttle opening TA becomes larger from the set opening TAH from this state, the air-fuel ratio A/F is made smaller, that is, the air-fuel mixture is made rich, and simultaneously the supercharged pressure PD is reduced to a relatively low target supercharged pressure TPDL. The amount of reduction of the supercharged pressure PD (TPDH—TPDL) is set so that at this time the amount of increase of the engine output due to the air-fuel ratio A/F becoming smaller and the amount of decrease of the engine output due to the supercharged pressure PD being made lower become equal. Therefore, the engine output will not fluctuate even if the throttle opening TA reaches the set opening TAH, the air-fuel ratio A/F becomes smaller, and the supercharged pressure PD is lowered. Therefore, as shown in FIG. 4, the engine output increases smoothly along with the increase of the throttle opening TA.

On the other hand, as shown in FIG. 4, when the throttle opening TA is larger than the set opening TAL <TAH), the air-fuel ratio A/F is made a small air-fuel ratio, that is, the air-fuel mixture is made rich, and the supercharged pressure PD is maintained at a relatively low target supercharged pressure PDL. If the throttle opening TA becomes smaller than the set opening TAL from this state, the air-fuel ratio A/F is increased, that is, the air-fuel mixture is made lean, with hysteresis as shown by the broken line in FIG. 4, and simultaneously the supercharged pressure PD is increased to a relatively high target supercharged pressure TPDH. The amount of the supercharged pressure PD (TPDH—TPHL) is set so that the amount of decrease of the engine output due to the air-fuel ratio A/F being made larger and the amount of increase of the engine output due to the supercharged pressure PD being raised become equal even at this time. Therefore, the engine output will not fluctuate even if the throttle opening TA reaches the set opening TAL, the air-fuel ratio A/F is made larger, and the supercharged pressure PD is raised. Therefore, as shown in FIG. 4, the engine output is smoothly reduced along with the throttle opening TA becoming smaller.

Figure 5A:
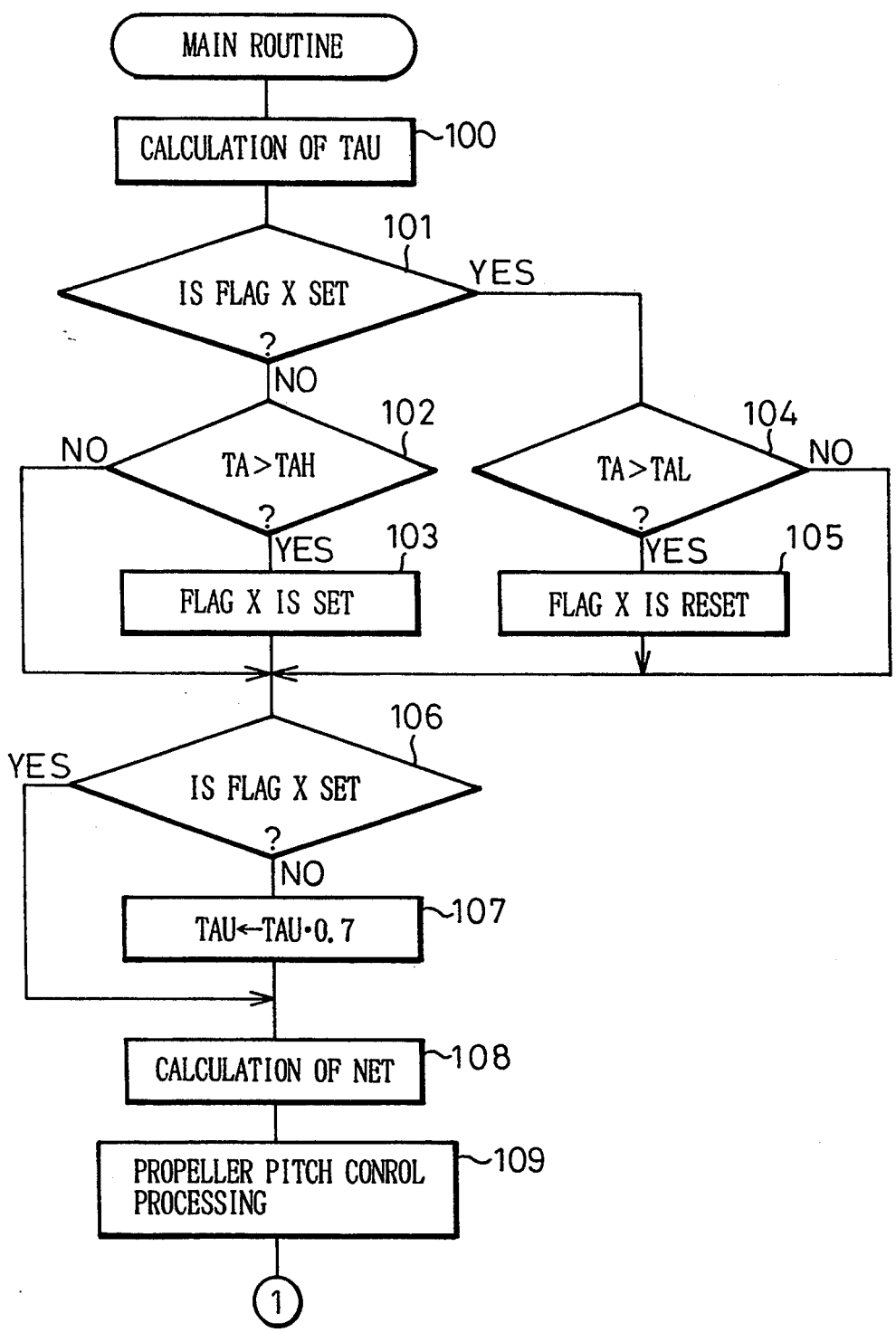
FIGS. 5A to FIG. 5C are flow charts of a main routine.
Figure 5B:
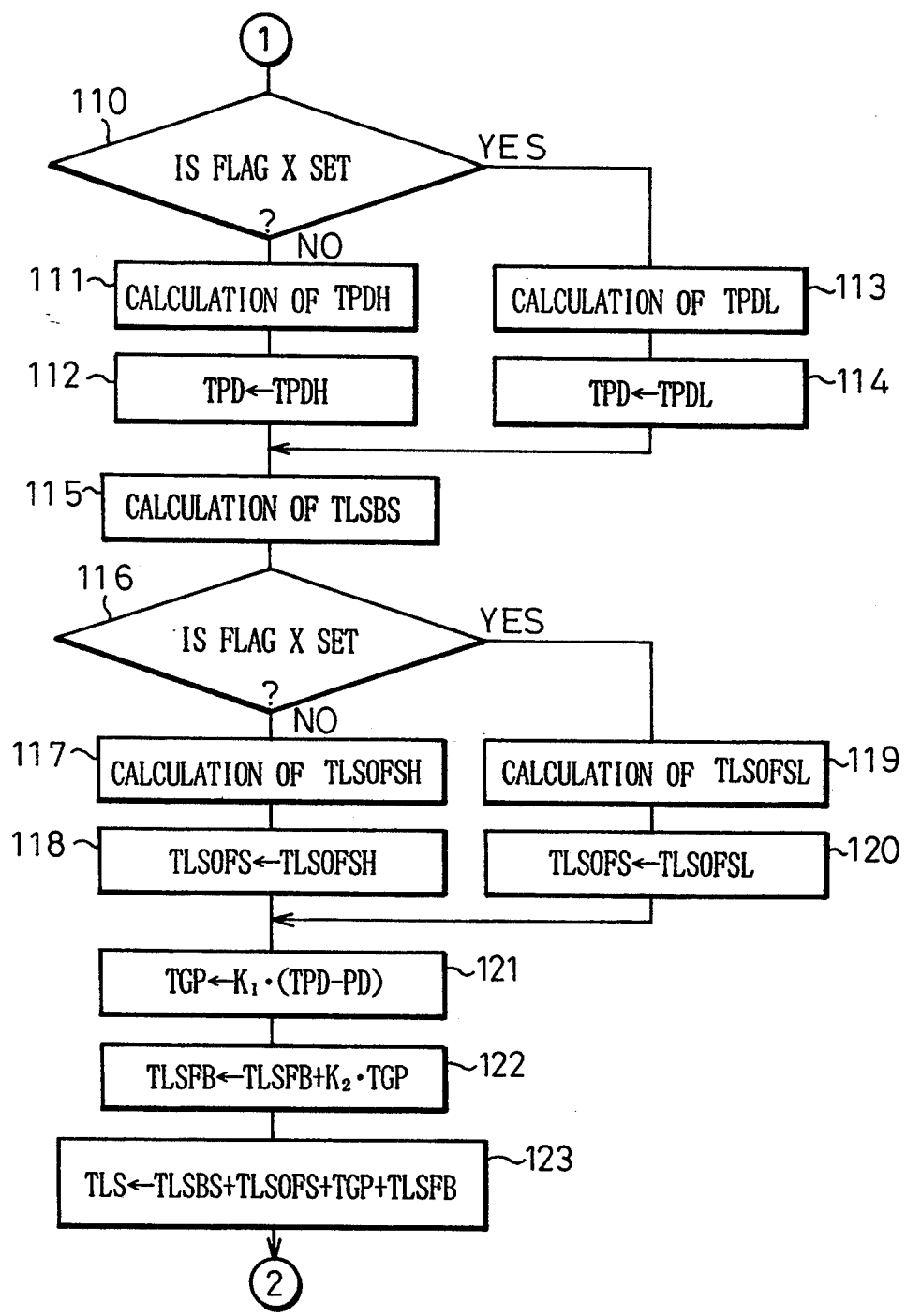
Figure 5C:
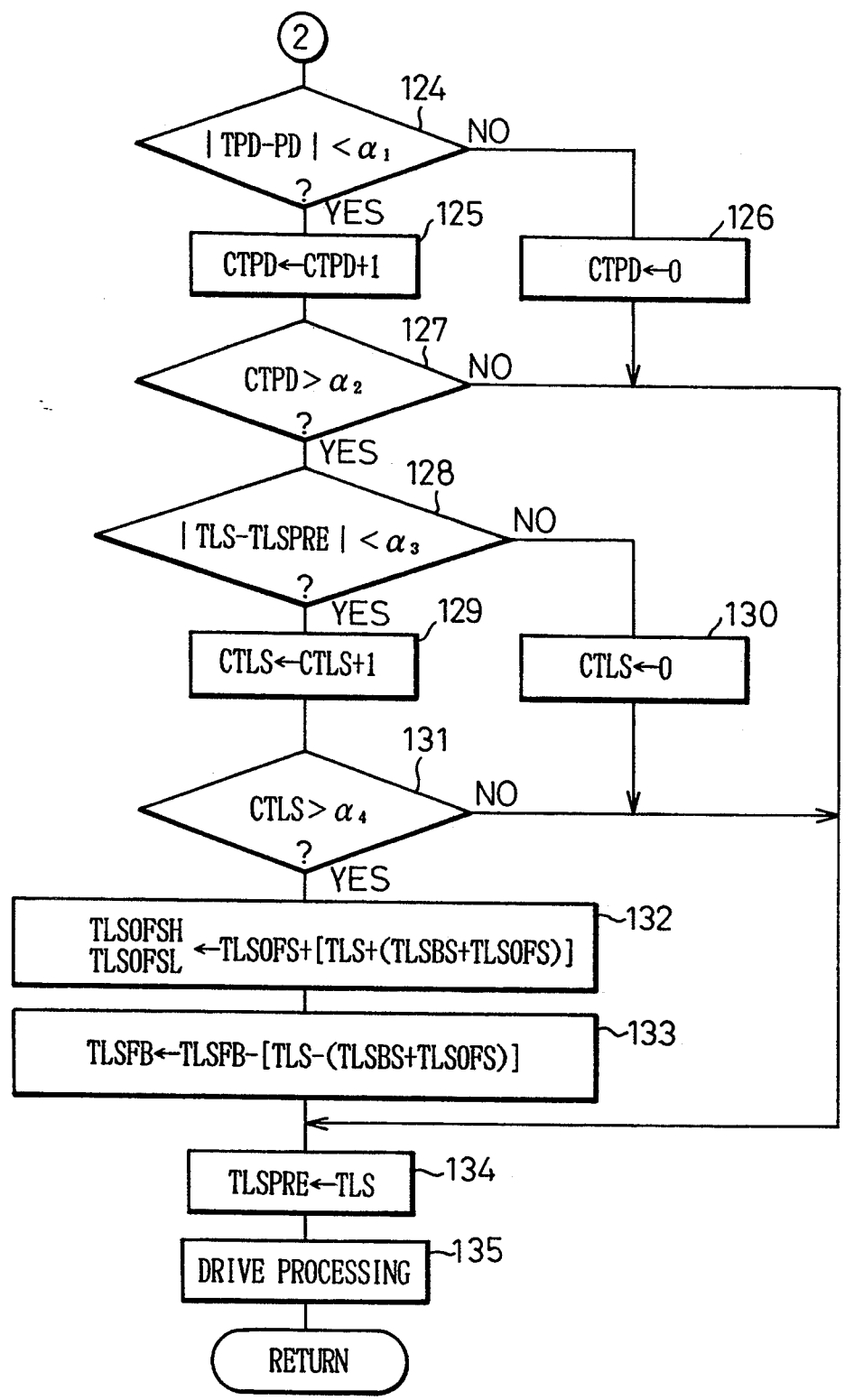

FIG. 5A to FIG. 5C show an example of the routine for execution of control of the air-fuel ratio A/F and the supercharged pressure PD shown in FIG. 4. As mentioned earlier, the supercharged pressure PD is obtained by controlling the current TLS to be supplied to the linear solenoid valve 31. In the embodiment shown from FIG. 5A to FIG. 5C, the current TLS to be supplied to the linear solenoid valve 31 is subjected to proportional integration (PI) control so that the supercharged pressure PD would quickly match the target supercharged pressure TPDL when the throttle opening TA becomes larger and reaches the set opening TAH. The current TLS to be supplied to the linear solenoid valve 31 is subjected to proportional integration (PI) control so that the supercharged pressure PD quickly matches the target supercharged pressure TPDH when the throttle opening TA becomes smaller and reaches the set opening TAL.

Further, in this embodiment, the current TLS to be supplied to the linear solenoid valve 31 is subjected to learning control so that the supercharged pressure PD is made to quickly match the target supercharged pressure TPDH even when there are variations in the components or even when the components age. The current TLS to be supplied to the linear solenoid valve 31 is subjected to learning control for making the supercharged pressure PD quickly match the target supercharged pressure TPDH when the throttle opening TA becomes smaller and reaches the set opening TAL.

Figure 6:
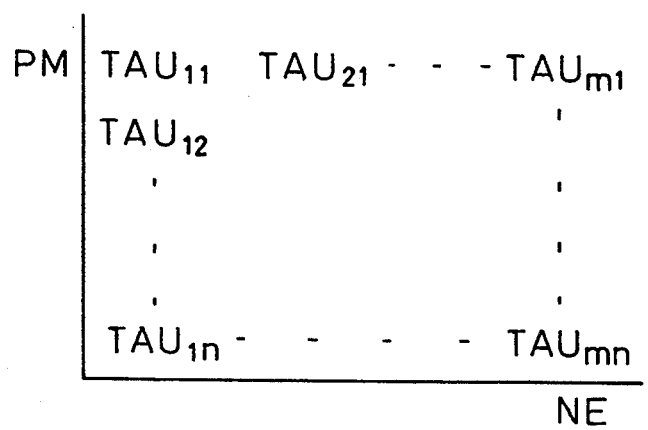
FIG. 6 is a view of a map of the fuel injection time TAU.

Referring to FIG. 5A to FIG. 5C, first, at step 100, the fuel injection time TAU is calculated based on the output signals of the PM sensor 33 and the engine rotational speed NE. The fuel injection time TAU is stored in advance in the ROM 62 in a map form as shown in FIG. 6 as a function of the absolute pressure PM in the intake duct 6 downstream of the throttle valve 11 and the engine rotational speed NE. Note that the fuel injection time TAU is determined so as to give a predetermined set air-fuel ratio by which the air-fuel mixture supplied inside the engine cylinders becomes rich.

Next, at step 101, it is determined if a flag X showing that the air-fuel mixture should be made rich is set or not. When the flag X is not set, that is, when the air-fuel mixture is lean, the routine proceeds to step 102, where it is determined based on the output signal of the TA sensor 35 if the throttle opening TA has become larger than the set opening TAH (FIG. 4) or not. When TA≦TAH, the routine jumps to step 106, while when TA>-TAH, the routine proceeds to step 103, where the flag X is set, then proceeds to step 106.

On the other hand, if at step 101 it is determined that the flag X has been set, that is, when the air-fuel mixture is rich, the routine proceeds to step 104, where it is determined if the throttle opening TA has become smaller than the set opening TAL (FIG. 4). When TA≧TAL, the routine jumps to step 106, while when TA<TAL, the routine proceeds to step 105, where the flag X is reset. Next, the routine proceeds to step 106.

At step 106, it is determined once again if the flag X has been set or not. When the flag X has been set, the routine jumps to step 108, while when the flag X is reset, the routine proceeds to step 107, where 0.7 TAU is made the fuel injection time TAU. Next, the routine proceeds to step 108. Therefore, when the flag X is set, the value of the map shown in FIG. 6 becomes the fuel injection time TAU as it is, so at that time the air-fuel mixture becomes rich, while when the flag X is reset, 0.7 TAU is made the fuel injection time TAU, so the air-fuel mixture becomes lean.

Figure 7:
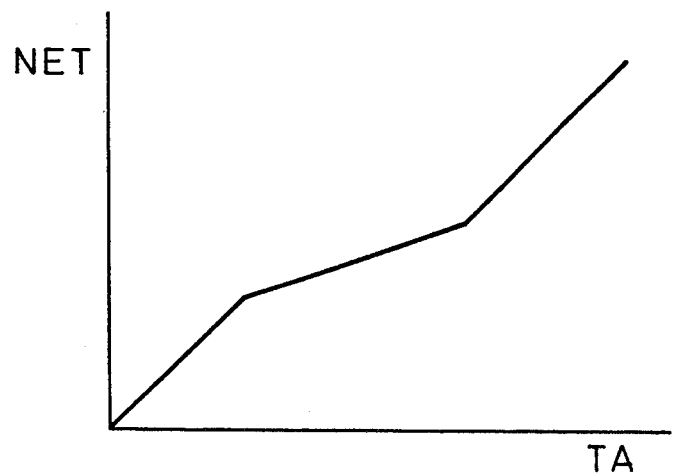
FIG. 7 is a graph of the target rotational speed NET.

At step 108, the target engine rotational speed NET is calculated based on the output signals of the TA sensor 35. The target engine rotational speed NET is a function of the throttle opening TA as shown in FIG. 7. The function shown in FIG. 7 is stored in advance in the ROM 62. Next, at step 109, the propeller pitch control actuator 53 is controlled so that the engine rotational speed NE becomes the target rotational speed NET based on the throttle opening TA shown in FIG. 7. That is, if the engine rotational speed NE becomes higher than the target rotational speed NET, oil is supplied into the oil pressure chamber 46. As a result, the pitch angle of the propeller 2 becomes larger, so the engine rotational speed NE is reduced. As opposed to this, when the engine rotational speed NE becomes lower than the target rotational speed NET, the oil in the oil pressure chamber 46 is discharged and therefore the pitch angle of the propeller 2 becomes smaller, so the engine rotational speed NE is raised. In this way, the engine rotational speed NE is controlled to the target rotational speed NET.

Next, at step 110, it is determined once again if the flag X has been set or not. When the flag X has been reset, the routine proceeds to step 111, where the target supercharged pressure TPDH (FIG. 4) for when the air-fuel mixture is lean is calculated. Next, at step 112, TPDH is made TPD, then the routine proceeds to step 115. On the other hand, when at step 110 it is determined that the flag X has been set, the routine proceeds to step 1113, where the target supercharged pressure TPDL (FIG. 4) for when the air-fuel mixture becomes rich is calculated. Next, at step 114, TDPL is made TPD, then the routine proceeds to step 115.

Figure 8A:
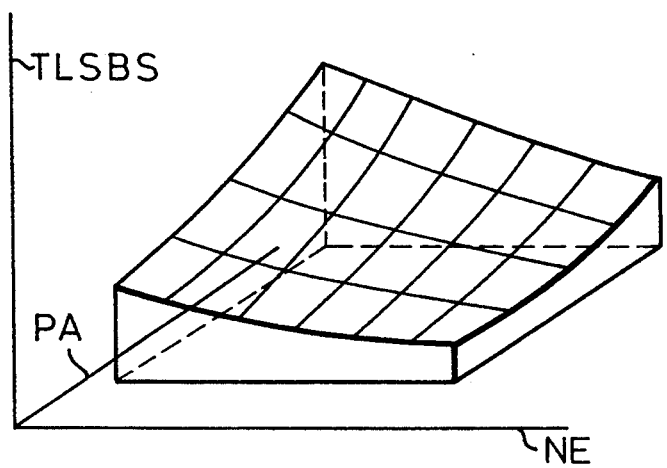
FIGS. 8A to FIG. 8C are views of the basic current TLSBS and the corrected currents TLSOFSH and TLSOFSL.

Next, at step 115, the basic control amount TLSBS, that is, the basic current TLSBS to be supplied to the linear solenoid valve 31, is calculated based on the output signals of the NE sensor 32 and the PA sensor 36. The basic current TLSBS is related as shown in FIG. 8A to the engine rotational speed NE and the atmospheric pressure PA. This relationship is stored in the ROM 62 in advance. This basic current TLSBS shows the current found in advance by experiments and required for making the supercharged pressure PD substantially equal to the target supercharged pressure TPDH (FIG. 4) when the air-fuel mixture is lean.

Figure 8B:
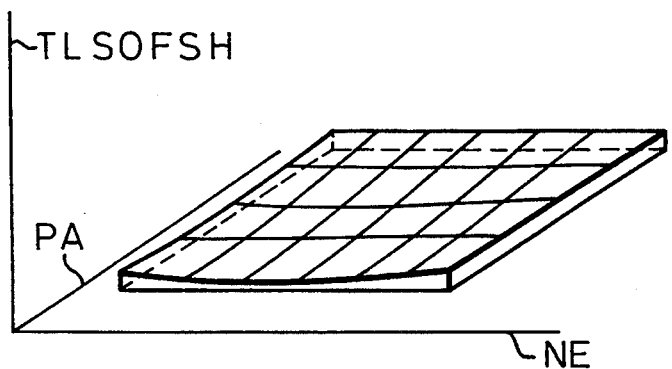

Next, at step 116, it is determined once again if the flag X has been set or not. When the flag X has been reset, that is, when the air-fuel mixture is lean, the routine proceeds to step 117, where the corrected current TLSOFSH with respect to the basic current TLSBS is calculated based on the output signals of the NE sensor 32 and the PA sensor 36. This corrected current TLSOFSH has the relationship shown in FIG. 8B with respect to the engine rotational speed NE and the atmospheric pressure PA. This relationship is stored in advance in the ROM 62. The corrected current TLSOFSH is subjected to learning control in the subsequent routine and therefore the corrected current TLSOFSH is subsequently called the learned corrected current. As mentioned earlier, the basic current TLSBS shows the current required for the supercharged pressure PD to become substantially equal to the target supercharged pressure TPDH (FIG. 4) when the air-fuel mixture is lean and therefore the learned corrected current TLSOFSH becomes a relatively small value as shown in FIG. 8B. Next, at step 118, the learned corrected current TLSOFSH is made the TLSOFS and the routine proceeds to step 121.

Figure 8C:
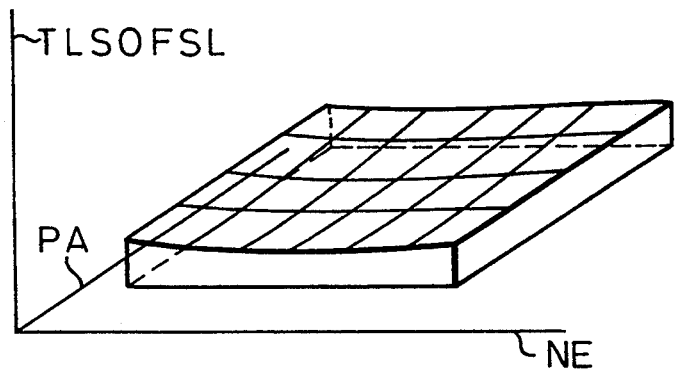

As opposed to this, when it is determined at step 116 that the flag X has been set, that is, when the air-fuel mixture is rich, the routine proceeds to step 119, where the corrected current TLSOFSL with respect to the basic current TLSBS is calculated based on the output signals of the NE sensor 32 and the PA sensor 36. The corrected current TLSOFSL has the relationship shown in FIG. 8C with respect to the engine rotational speed and the atmospheric pressure PA. This relationship is stored in advance in the ROM 62. This corrected current TLSOFSL is subject to learning control in the subsequent routine and therefore is subsequently called the learned corrected current. As mentioned earlier, the basic current TLSBS shows the current required for the supercharged pressure PD to become substantially equal to the target supercharged pressure TPDH (FIG. 4) when the air-fuel mixture is lean and therefore the learned corrected current TLSOFSH becomes a relatively large value as shown in FIG. 8C. Next, at step 120, the learned corrected current TLSOFSH is made the TLSOFS and the routine proceeds to step 121.

The routine from step 121 to step 123 shows the routine for making the supercharged pressure PD approach the target supercharged pressure by proportional integration (PI) control. That is, first, at step 121, the difference between the target supercharged pressure TPD and the actual supercharged pressure PD detected by the PD sensor 34 is used to calculate the proportional term TGP of the current based on the following equation. Note that in the following equation, $K_1$ shows a constant.

$$TGP = K_1 \cdot (TPD - PD)$$

Next, at step 122, the proportional term TGP is used to calculate the integration term TLSFB by the following equation. Note that in the following equation, $K_2$ shows a constant.

$$TLSFB = TLSFB + K_2 \cdot TGP$$

Next, at step 123, the current TLS to be supplied to the linear solenoid valve 31 is calculated from the basic current TLSBS, the learned corrected current TLSOFS, the proportional term TGP, and the integration term TLSFB based on the following equation:

$$TLS = TLSBS + TLSOFS + TGP + TLSFB$$

Next, in the routine from step 124 to step 134, learning control of the learned corrected current valve TLSOFS is performed. That is, first, at step 124, it is determined if the difference $|TPD - PD|$ between the target supercharged pressure TPD and the actual supercharged pressure PD is smaller than a certain value $\alpha_1$ or not. When $|TPD - PD| \geq \alpha_1$, the routine proceeds to step 126, where the count CTPD is cleared and then the routine proceeds to step 134. As opposed to this, when $|TPD - PD| < \alpha_1$, the routine proceeds to step 125, where the count value CTPD is incremented by 1, then the routine proceeds to step 127.

At step 127, it is determined if the count value CTPD has become larger than the set value $\alpha_2$ or not. When CTPD $\leq \alpha_2$, the routine proceeds to step 134, while if CTPD $> \alpha_2$, the routine proceeds to step 128, where it is determined if the difference $|TLS - TLSPRE|$ between the current TLS calculated this time and the current TLSPRE calculated the previous time is smaller than a set value $\alpha_3$ or not. When $|TLS - TLSPRE| \geq \alpha_3$, the routine proceeds to step 130, where the count CTLS is cleared, then the routine proceeds to step 134. As opposed to this, if $|TLS - TLSPRE| < \alpha_3$, the routine proceeds to step 128, where the count CTLS is incremented by 1 and then the routine proceeds to step 131.

At step 131, it is determined if the count CTLS has become larger than a set value $\alpha_4$ or not. When CTPD $\leq \alpha_4$, the routine proceeds to step 134, while if CTPD $> \alpha_4$, the routine proceeds to step 132. Therefore, the routine proceeds to step 132 when the supercharged pressure PD is maintained at substantially the target supercharged pressure TPD for more than a certain time and the current TLS is maintained substantially constant for at least a certain time.

At step 132, when the air-fuel mixture is lean, the learned corrected current TLSOFSH or, when the air-fuel mixture is rich, the learned corrected current TLSOFSL, is calculated based on the following equation:

$$TLSOFSH \text{ or } TLSOFSL = TLSOFS + [TLS - (TLSBS + TLSOFS)]$$

Here, as explained earlier, since [TLS = TLSBS + TLSOFS + TGP + TLSFB, [TLS − (TLSBS + TLSOFS +] in the equation becomes equal to TGP + TLSFB. On the other hand, when the routine proceeds to step 132, TPD − PD ≈ 0, so TGP ≈ 0. Therefore, in the above equation, [TLS − (TLSBS + TLSOFS)] ≈ TLSFB. That is, the above equation becomes the following equation:

$$\text{TLSOFSH or TLSOFSL} \approx \text{TLSOFSH or} \\ \text{TLSOFSH} + \text{TLSFB}$$

That is, the learned corrected current TLSOFSH or TLSOFSL plus the integration term TLSFB is made the new learned corrected current TLSOFSH or TLSOFSL.

Next, at step 133, a new integration term TLSFB is calculated based on the following equation:

$$TLSFB = TLSFB - [TLS - (TLSBS + TLSOFS)]$$

That is, the integration term TLSFB minus the amount added to the learned corrected current TLSOFSH or TLSOFSL is made the new integration term TLSFB. In this way, even when there is some variation in the components due to correction of the learned corrected current TLSOFSH or TLSOFSL and the integration term TLSFB or even when the components have aged, it is possible to make the supercharged pressure PD immediately match the target supercharged pressure TPDH or TPDL when the target supercharged pressure TPDH or TPDL change.

At step 133, when the new integration term TLSFB is calculated, the routine proceeds to step 134, where the current TLS is made TLSPRE. Next, at step 135, the current supplied to the linear solenoid valve 31 is made TLS.

FIG. 9A to FIG. 11C show another embodiment. This embodiment shows the case where the propeller speed changer 70 shown in FIG. 9A to FIG. 9C and FIG. 10 is used to control the engine rotational speed NE to the target rotational speed. In this embodiment, the throttle valve 11 and the propeller speed changer 70 are simultaneously controlled by a power lever 12' provided at the pilot's seat and, further, a switch 71 is provided for changing the air-fuel mixture.

Figure 10:
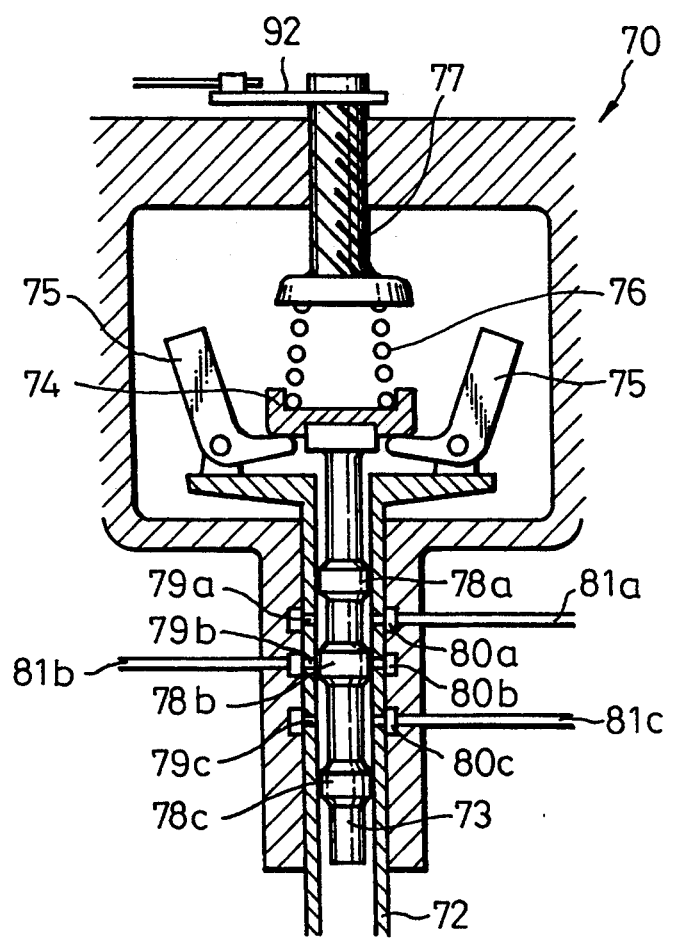
FIG. 10 is a side sectional view schematically showing a propeller speed changer.

Referring to FIG. 10, the propeller speed changer 70 is provided with a hollow cylindrical rotational sleeve 72 which is made to rotate at a speed proportional to the propeller shaft 40, a sleeve valve 73 inserted in the rotational sleeve 72, an endplate 74 affixed at the top end of a spool valve 73, a pair of flyweights 75 supported rotably by the rotational sleeve 72 and biasing the endplate 74 upward, a compression spring 76 biasing the endplate 74 downward, and a control shaft 77 screwed to the housing of the propeller speed changer 70 for controlling the spring force of the compression spring 76.

As shown in FIG. 10, the spool valve 73 has three lands 78a, 78b, and 78c formed on it. Further, the rotational sleeve 72 has formed in it a first oil hole 79a, a second oil hole 79b, and a third oil hole 79c. Around the first oil hole 79a is formed an annular oil groove 80a, which oil groove 80a is connected to an oil tank (not shown) through an oil return conduit 81a. Around the second oil hole 79b is formed an annular oil groove 80b, which oil groove 80b is connected to an oil pressure chamber 46 (FIG. 2) in the propeller shaft 40 through an oil conduit 81b. Around the third oil hole 79c is formed an annular oil groove 80c, in which oil groove 80c oil discharged from an oil pump (not shown) is supplied through an oil supply conduit 81c.

FIG. 10 shows the state when the rotational speed of the propeller 2 is maintained at the target rotational speed, that is, when the engine rotational speed NE is maintained at the target rotational speed. At this time, the second oil hole 78b is closed by the land 78b of the spool valve 73 and therefore the piston 45 in the propeller shaft 40 is at rest. Therefore, at this time, the propeller 2 is held at a certain pitch angle.

As opposed to this, when the engine rotational speed NE becomes higher than the target rotational speed, the spool valve 73 is made to rise by the action of the fly weight 75. When the spool valve 73 rises, the second oil hole 79b is communicated with the third oil hole 79c, so oil is supplied into the oil pressure chamber 46 of the propeller shaft 40. As a result, the pitch angle of the propeller 2 becomes larger and therefore the engine rotational speed NE is made lower.

On the other hand, when the engine rotational speed NE becomes lower than even the target rotational speed, the spool valve 73 is made to descend due to the action of the fly weight 75. When the spool valve 73 descends, the second oil hole 79b communicates with the first oil hole 79a, so the oil in the oil pressure chamber 46 of the propeller shaft 40 is returned to the oil tank. As a result, the pitch angle of the propeller 2 becomes smaller and therefore the engine rotational speed NE is raised. In this way, the engine rotational speed NE is held to the target rotational speed.

However, if the pressing force of the endplate 74 due to the compression spring 76 is made stronger, then the engine rotational speed, that is, the target rotational speed, will rise when the second oil hole 79b is closed by the land 78b of the spool valve 73 as shown in FIG. 10. The pressing force of the endplate 74 due to the compression spring 76 may be controlled by turning the control shaft 77 and therefore the target rotational speed may be controlled by turning the control shaft 77.

Figure 9A:
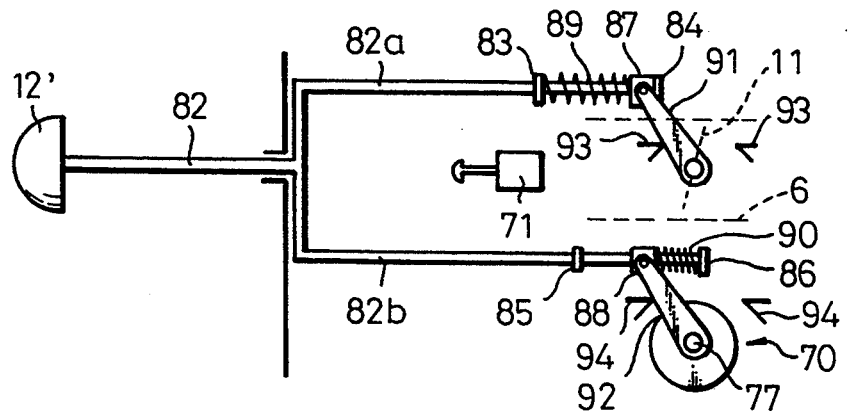
FIGS. 9A to FIG. 9C are views of the control system using a power lever.

Referring to FIG. 9A, the rod 82 of the power lever 12' is branched into a pair of branch rods 82a and 82b, which branch rods 82a and 82b have attached to them pairs of stators 83, 84 and 85, 86 and sliders 87 and 88 disposed between the stators 83, 84 and 85, 86. Further, a compression spring 89 is arranged between the stator 83 and the slider 87 and a compression spring 90 is inserted between the stator 86 and the slider 88. The slider 87 is connected to a lever 9a attached to the throttle shaft of the throttle valve 11, while the slider 88 is connected to a lever 92 affixed to a control shaft 77 of the propeller speed changer 70. The levers 91 and 92 are each provided with position limiting stoppers 93 and 94. The switch 71 is arranged to be engageable with the branched portion of the rod 82.

Figure 9B:
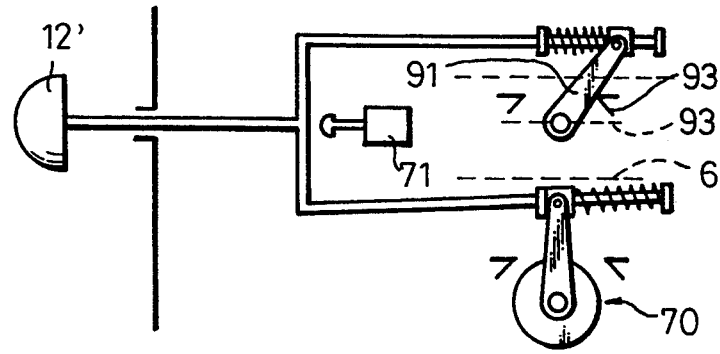

FIG. 9A shows the state at the time of low engine speed. At this time, the opening of the throttle valve 11 is small and the target rotational speed set by the propeller speed changer 70 is low. Further, the air-fuel mixture is lean. When the power lever 12' is pushed from the state shown in FIG. 9A, the throttle valve 11 gradually opens, but the target rotational speed set by the propeller speed changer 70 continues to remain low. When the power lever 12' is further pushed and the stator 85 abuts against the slider 88, the throttle valve 11 is opened the more the power lever 12' is pushed further and the lever 92 of the propeller speed changer 70 is rotated in the direction making the target rotational speed higher. Next, when the power lever 12' is further pushed, the throttle valve 11 fully opens, and the lever 91 abuts against the stopper 93 as shown in FIG. 9B, the throttle valve 11 is subsequently held in the fully opened state. As the power lever 12' is further pushed, the lever 92 of the propeller speed changer 70 is rotated in the direction raising the target rotational speed. In the interval up to here, the switch 71 is off and therefore the air-fuel mixture becomes lean.

Figure 9C:
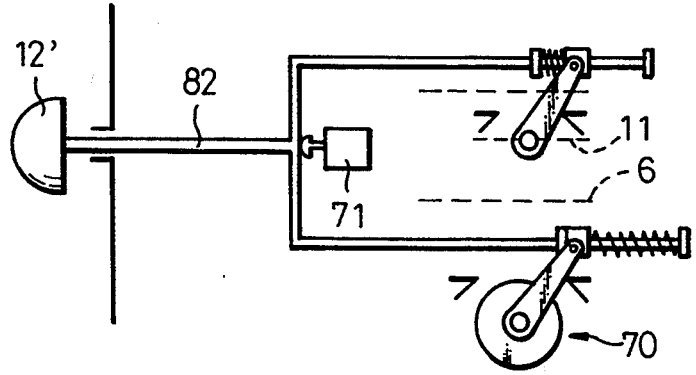

Next, when the lower lever 12' is further pushed, as shown in FIG. 9C, the branch portion of the rod 82 strikes the switch 71 to turn the switch 71 on. When the switch 71 is turned on, the air-fuel mixture changes from lean to rich. When the power lever 12' is further pushed, the lever 92 of the propeller speed changer 70 is made to rotate in a direction making the target rotational speed further higher.

Figure 11A:
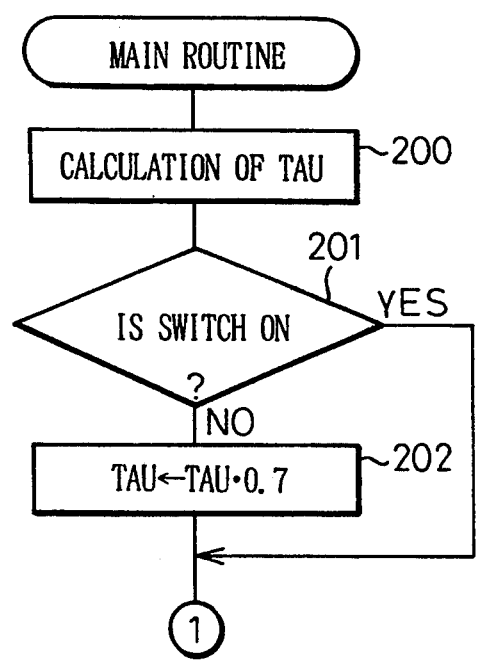
FIGS. 11A to FIG. 11C are flow charts of a main routine.
Figure 11B:
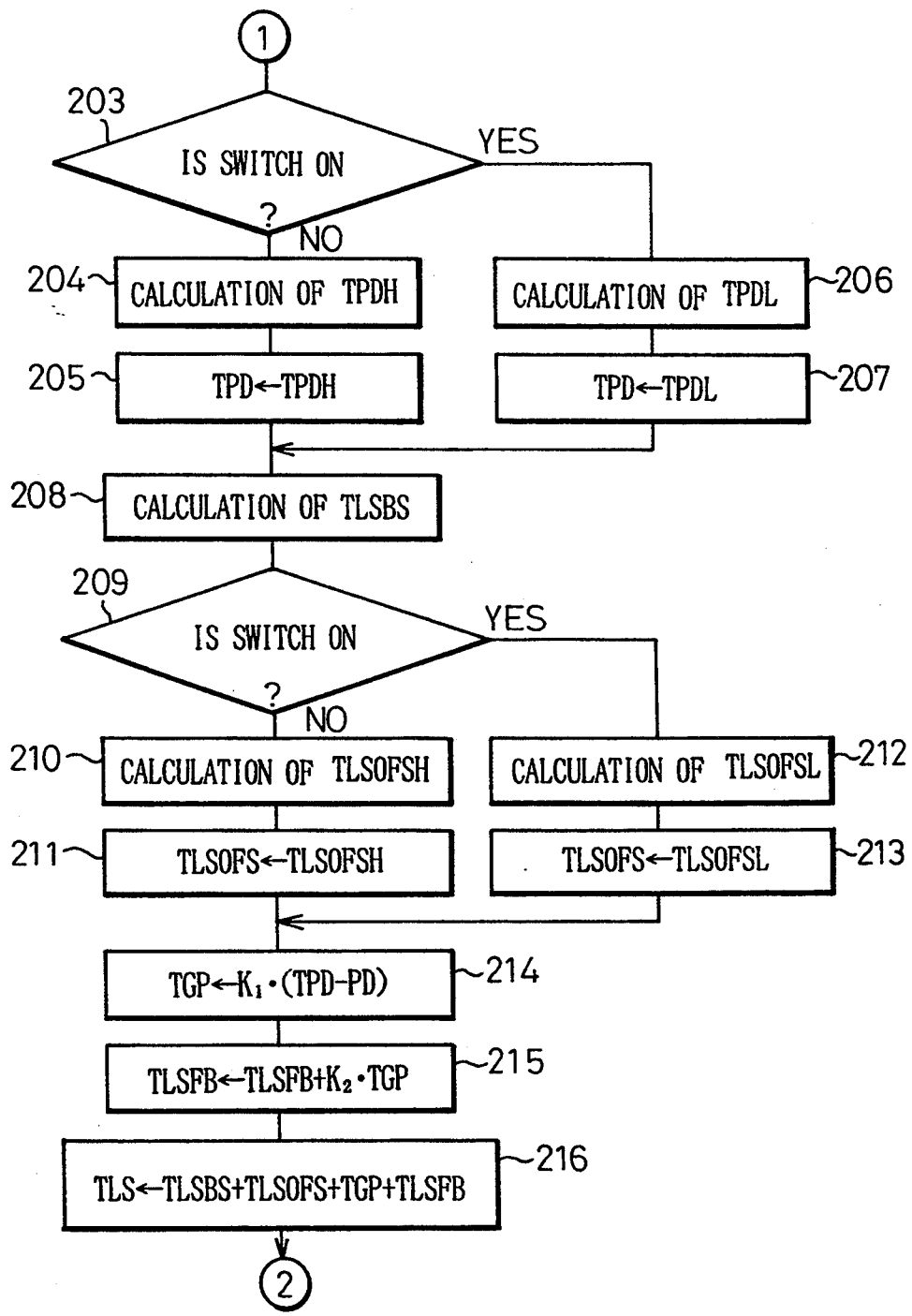
Figure 11C:
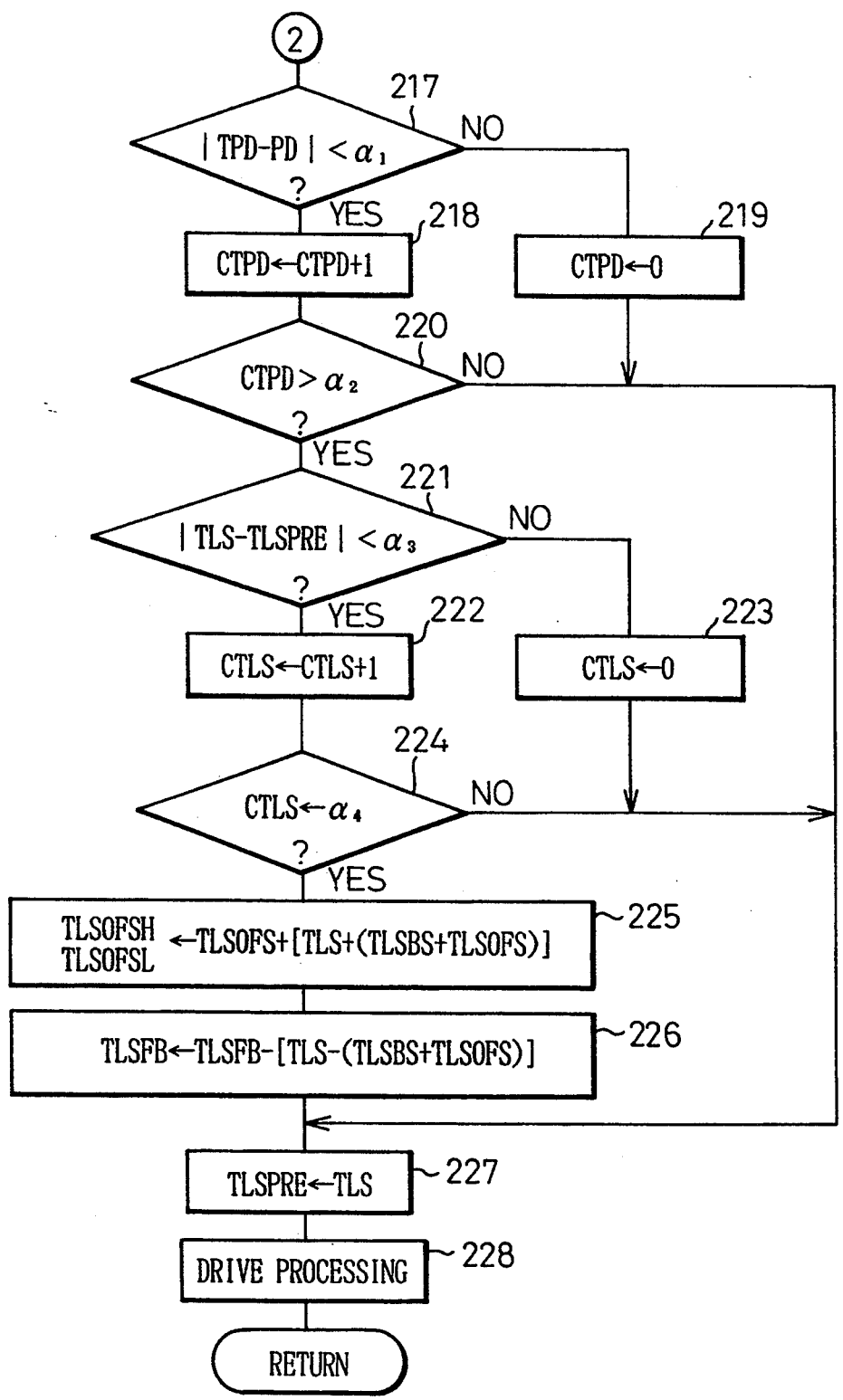

FIG. 11A to FIG. 11C show the main routine in the case of use of the power lever 12' and the propeller speed changer 70 shown in FIGS. 9A to 9C and FIG. 10.

Referring to FIG. 11A to FIG. 11C, first, at step 200, the fuel injection time TAU is calculated based on the output signal of the PM sensor 33 and the engine rotational speed NE. The fuel injection time TAU is stored in advance in the ROM 62 in the form of the map shown in FIG. 6 as a function of the absolute pressure PM in the intake duct 6 downstream of the throttle valve 11 and the engine rotational speed NE. Note that the fuel injection time TAU is set so as to obtain a predetermined air-fuel ratio whereby the air-fuel mixture supplied in the engine cylinders becomes rich.

Next, at step 201, it is determined if the switch 71 is on or not, that is, if the air-fuel mixture should be made rich. When the switch 71 is on, the routine jumps to step 203, while when the switch 71 is off, the routine proceeds to step 202, where 0.7 TAU is made the fuel injection time TAU. Next, the routine proceeds to step 203. Therefore, when the switch 71 is on, the value of the map shown in FIG. 6 becomes the fuel injection time TAU as it is, so at the time the air-fuel mixture becomes rich, while when the switch 71 is off, 0.7 TAU is made the fuel injection time TAU, so the air-fuel mixture becomes lean.

Next, at step 203, it is determined once again if the switch 71 is on. When the switch 71 is off, the routine proceeds to step 204, where the target supercharged pressure TPDH (FIG. 4) when the air-fuel mixture is lean is calculated. Next, at step 205, the TPDH is made TPD and the routine proceeds to step 208. On the other hand, when it is determined at step 203 that the switch 71 is on, the routine proceeds to step 206, where the target supercharged pressure TPDL (FIG. 4) when the air-fuel mixture is rich is calculated. Next, at step 207, TPDL is made TPD and the routine proceeds to step 208.

Next, at step 208, the standard control amount TLSBS, that is, the basic current TLSBS to be supplied to the linear solenoid valve 31, is calculated based on the output signals of the NE sensor 32 and the PA sensor 36. The basic current TLSBS has the relationship shown in FIG. 8A with respect to the engine rotational speed NE and the atmospheric pressure PA. This relationship is stored in advance in the ROM 62. This basic current TLSBS shows the current found in advance by experiments and necessary for the supercharged pressure PD to be made substantially equal to the target supercharged pressure TPDH (FIG. 4) when the air-fuel mixture is lean.

Next, at step 209, it is determined once again if the switch 17 is on. When the switch 71 is off, that is, when the air-fuel mixture is lean, the routine proceeds to step 210, where the corrected current TLSOFSH with respect to the basic current TLSBS is calculated based on the output signals of the NE sensor 32 and the PA sensor 36. The corrected current TLSOFSH has the relationship shown in FIG. 8B with respect to the engine rotational speed NE and the atmospheric pressure PA. This relationship is stored in advance in the ROM 62. The corrected current TLSOFSH is subjected to learning control in the subsequent routine and therefore the corrected current TLSOFSH is subsequently referred to as the learned corrected current. As mentioned earlier, the basic current TLSBS shows the current required for the supercharged pressure PD to become substantially equal to the target supercharged pressure TPDH (FIG. 4) when the air-fuel mixture is lean and therefore the learned corrected current TLSOFH becomes a relatively small value as shown in FIG. 8B. Next, at step 211, the learned corrected current TLSOFSH is made TLSOFS and the routine proceeds to step 214.

As opposed to this, when it is determined at step 203 that the switch 71 is on, that is, the air-fuel mixture is rich, the routine proceeds to step 212, where the corrected current TLSOFSL for the basic current TLSBS is calculated based on the output signals of the NE sensor 32 and the PA sensor 36. The corrected current TLSOFSL has the relationship shown in FIG. 8C with respect to the engine rotational speed NE and the atmospheric pressure PA. This relationship is stored in advance in the ROM 62. This corrected current TLSOFSL is subjected to learning control in the subsequent routine and therefore the corrected current TLSOFSL is subsequently referred to as the learned corrected current. As mentioned earlier, the basic current TLSBS shows the current necessary so that the supercharged pressure PD becomes substantially equal to the target supercharged pressure TPDH (FIG. 4) when the air-fuel mixture is lean. Therefore, the learned corrected current TLSOFSL becomes a relatively large value as shown in FIG. 8C. Next, at step 213, the learned corrected current TLSOFSL is made TLSOFS and the routine proceeds to step 214.

Step 214 to step 216 shows the routine for making the supercharged pressure PD approach the target supercharged pressure by the proportional integration (PI) control. That is, first, at step 214, the difference between the target supercharged pressure TPD and the actual supercharged pressure PD detected by the PD sensor 34 is used to calculate the proportional term TGP of the current based on the following equation. Note that in the following equation, $K_1$ shows a constant.

$$TGP = K_1 \cdot (TPD - PD)$$

Next, at step 215, the proportional term TGP is used to calculate the integration term TLSLB of the current by the following equation. Note that in the following equation, $K_2$ shows a constant.

$$TLSFB + TLSFB + K_2 \cdot TGP$$

Next, at step 216, the current TLS to be supplied to the linear solenoid valve 31 is calculated from the basic current TLSBS, the learned corrected current TLSOFS, the proportional term TGP, and the integration term TLSFB based on the following equation:

$$TLS = TLSBS + TLSOFS + TGP + TLSFB$$

Next, from step 217 to step 227, the learning control of the learned corrected current TLSOFS is performed.

That is, first, at step 217, it is determined if the difference $|TPD-PD|$ between the target supercharged pressure TPD and the actual supercharged pressure PD is smaller than a predetermined value $\alpha_1$ or not. When $|TPD-PD| \geq \alpha_1$, the routine proceeds to step 219, where the count CTPD is cleared, then the routine proceeds to step 227. As opposed to this, when $|TPD-PD| < \alpha_1$, the routine proceeds to step 218, where the count CTPD is incremented by 1, then the routine proceeds to step 220.

At step 220, it is determined if the count CTPD has become larger than a predetermined value $\alpha_2$ or not. When $CTPD \leq \alpha_2$, the routine proceeds to step 227, while when $CTPD > \alpha_2$, the routine proceeds to step 221, where it is determined if the difference $|TLS-TLSPRE|$ between the current TLS calculated this time and the current vale TLSPRE calculated the previous time is smaller than a predetermined value $\alpha_3$. When $|TLS-TLSPRE| \geq \alpha_3$, the routine proceeds to step 223, where the count CTLS is cleared, then the routine proceeds to step 227. As opposed to this, when $|TLS-TLSPRE| < \alpha_3$, the routine proceeds to step 222, where the count CTLS is incremented by 1, then the routine proceeds to step 224.

At step 224, it is determined if the count CTLS has become larger than the set value $\alpha_4$ or not. When $CTLS \leq \alpha_4$, the routine proceeds to step 227, while when $CTLS > \alpha_4$, the routine proceeds to step 225. Therefore, the routine proceeds to step 225 when the supercharged pressure PS is held substantially at the target supercharged pressure TPD for more than a predetermined time and the current TLS is held substantially constant for at least a certain period.

At step 225, when the air-fuel mixture is lean, the learned corrected current TLSOFSH is calculated by the following equation, while when the air-fuel mixture is rich, the learned corrected current TLSOFSL is calculated:

$$TLSOFSH \text{ or } TLSOFSL = TLSOFS + [TLS - (TLSBS + TLSOFS)]$$

Here, as explained earlier, since $TLS = TLSBS + TLSOFS + TGP + TLSFB$, the $[TLS - (TLSBS + TLSOFS)]$ in the above equation becomes equal to $TGP + TLSFB$. On the other hand, when the routine proceeds to step 225, $TPD - PD \approx 0$, so $TGP \approx 0$. Therefore, in the above equation, $[TLS - (TLSBS + TLSOFS)] \approx TLSFB$. That is, the above equation becomes as follows:

$$TLSOFSH \text{ or } TLSOFSL \approx TLSOFSH \text{ or } TLSOFSL + TLSFB$$

That is, the learned corrected current TLSOFSH or TLSOFSL plus the integration term TLSFB is made the new learned corrected current TLSOFSH or TLSOFSL.

Next, at step 226, a new integration term TLSFB is calculated based on the following equation:

$$TLSFB = TLSFB - [TLS - (TLSBS + TLSOFS)]$$

That is, the integration term TLSFB minus the amount added to the learned corrected current TLSOFSH or TLSOFSL is made the new integration term TLSFB. In this way, even when there is some variation in the components due to correction of the learned corrected current TLSOFSH or TLSOFSL and the integration term TLSFB or even when the components have aged, it is possible to make the supercharged pressure PD immediately match the target supercharged pressure TPDH or TPDL when the target supercharged pressure TPDH or TPDL change.

At step 226, when the new integration term TLSFB is calculated, the rotine proceeds to step 227, where the current TLS is made TLSPRE. Next, at step 228, the current supplied to the linear solenoid valve 31 is made TLS.

According to the present invention, there are simultaneously an action of increasing the engine output by reducing the air-fuel ratio and an action of decreasing the engine output by reducing the supercharged pressure, so it is possible to prevent any abrupt fluctuations in the engine output. As a result, when the air-fuel ratio is made smaller, it is possible to prevent any shock from occurring and the engine output changes smoothly, so it is possible to ensure excellent operability.

While the invention has been described by reference to specific embodiments chose for purposes of illustration, it should be apparent that numerous modifications could be made thereto by those skilled in the art without departing from the basic concept and scope of the invention.

We claim:

1. A device for controlling an output power of an engine having a supercharger, said device comprising:
air-fuel ratio control means for controlling an air-fuel ratio of a mixture fed into the engine cylinders to make said air-fuel ratio of the mixture equal to a predetermined first air-fuel ratio when the engine is operating in a predetermined first operating state and make the air-fuel ratio of the mixture equal to a predetermined second air-fuel ratio which is smaller than said first air-fuel ratio when the engine is operating in a predetermined second operating state and
supercharged pressure control means for controlling a supercharged pressure of air discharged from the supercharger and fed into the engine cylinders to make the supercharged pressure equal to a predetermined first supercharged pressure when the engine is operating in said first operating state and make the supercharged pressure equal to a predetermined second supercharged pressure which is lower than said first supercharged pressure when the engine is operating in said second operating state.

2. A device according to claim 1, wherein said first air-fuel ratio is larger than the stoichiometric air-fuel ratio and said second air-fuel ratio is smaller than the stoichiometric air-fuel ratio.

3. A device according to claim 1, wherein a difference between said first supercharged pressure and said second supercharged pressure is determined so that an increase in the engine output power obtained when the air-fuel ratio of the mixture is switched over from said first air-fuel ratio to said second air-fuel ratio becomes approximately equal to a reduction in the engine output power obtained when the supercharged pressure is switched over from said first supercharged pressure to said second supercharged pressure and that a reduction in the engine output power obtained when the air-fuel ratio of the mixture is switched over from said second air-fuel ratio to said first air-fuel ratio becomes approximately equal to an increase in the engine output power obtained when the supercharged pressure is switched over from said second supercharged pressure to said first supercharged pressure.

4. A device according to claim 1, wherein the engine has a throttle valve in an intake passage thereof and said air-fuel ratio control means controls the air-fuel ratio of the mixture in response to a degree of opening of said throttle valve to change over the air-fuel ratio from said first air-fuel ratio to said second air-fuel ratio when the degree of opening of said throttle valve becomes larger than a predetermined first degree of opening and to change over the air-fuel ratio from said second air-fuel ratio to said first air-fuel ratio when the degree of opening of said throttle valve becomes smaller than a predetermined second degree of opening which is smaller than said first degree of opening, said supercharged pressure control means controlling the supercharged pressure in response to the degree of opening of said throttle valve to change over the supercharged pressure from said first supercharged pressure to said second supercharged pressure when the degree of opening of said throttle valve becomes larger than said first degree of opening and to change over the supercharged pressure from said second supercharged pressure to said first supercharged pressure when the degree of opening of said throttle valve becomes smaller than said second degree of opening.

5. A device according to claim 1, further comprising a throttle valve arranged in an intake passage of the engine, a propeller pitch control device for controlling a pitch angle of a propeller, a manually operated power level connected to both said throttle valve and said propeller pitch control device for controlling the output power of the engine, and detecting means for detecting whether or not said power level is positioned on a high output power side with respect to a predetermined position, said air-fuel ratio control means controlling the air-fuel ratio in response to an output signal of said detecting means to change over the air-fuel ratio from said first air-fuel ratio to said second air-fuel ratio when said power lever is positioned on said high output power side with respect to said predetermined position, said supercharged pressure control means controlling the supercharged pressure in response to the output signal of said detecting means to change over the supercharged pressure from said first supercharged pressure to said second supercharged pressure when said power lever is positioned on said high output power side with respect to said predetermined position.

6. A device according to claim 5, wherein the degree of opening of said throttle valve becomes large as said power lever is caused to move toward said high output power side and said propeller pitch control device controls the pitch angle of said propeller so that an engine speed becomes equal to a target speed which becomes higher as said power lever is caused to move toward said high output power side.

7. A device according to claim 5, wherein said power lever comprises a common rod and a pair of branch rods branched off from said con, non rod and connected to said throttle valve and said propeller pitch control device, respectively, and said detecting means comprises a switch which is operated by said common rod.

8. A device according to claim 1, wherein the supercharger comprises a turbine driven by exhaust gas, a bypass exhaust gas passage bypassing said turbine, a waste gate valve arranged in said bypass exhaust gas passage, and an electrically operated actuator for actuating said waste gate valve, and said supercharged pressure control means comprises a first memory storing a first basic current to be applied to said actuator to make the supercharged pressure equal to said first supercharged pressure and a second memory storing a second basic current to be applied to said actuator to make the supercharged pressure equal to said second supercharged pressure.

9. A device according to claim 8, wherein said supercharged pressure control means comprises detecting means for detecting the supercharged pressure and said supercharged pressure control means changes an amount of current to be applied to said actuator relative to said first basic current on the basis of a first difference between said first supercharged pressure and the supercharged pressure detected by said detecting means to make the supercharged pressure detected by said detecting means equal to said first supercharged pressure when the engine is operating in said first operating state, said supercharged pressure control means changing an amount of current to be applied to said actuator relative to said second basic current on the basis of a second difference between said second supercharged pressure and the supercharged pressure detected by said detecting means to make the supercharged pressure detected by said detecting means equal to said second supercharged pressure when the engine is operating in said second operating state, said supercharged pressure control means comprising learning control means for updating said first basic current so as to eliminate said first difference when the engine is operating in said first operating state and for updating said second basic current so as to eliminate said second difference when the engine is operating in said second operating state.

10. A device according to claim 9, wherein said learning control means carries out an updating operation of said first basic current and said second basic current when a difference between said first supercharged pressure and the supercharged pressure detected by said detecting means and a difference between said second supercharged pressure and the supercharged pressure detected by said detecting means are maintained below a predetermined value for a predetermined time, respectively.

11. A device according to claim 9, wherein said learning control means carries out an updating operation of said first basic current and said second basic current when a change in the amount of the current applied to said actuator is maintained below a predetermined value for a predetermined time.

* * * * *

UNITED STATES PATENT AND TRADEMARK OFFICE
CERTIFICATE OF CORRECTION

PATENT NO. : 5,363,652
DATED : November 15, 1994
INVENTOR(S) : Shigetaka TANAKA, ET AL.

It is certified that error appears in the above-indentified patent and that said Letters Patent is hereby corrected as shown below:

Column 5, line 12, change "<TAH), to --(<TAH),--.

Column 8, line 17, change "valve" to --value--.

Column 8, line 63, change "...TLSOFS+]" to --...TLSOFS]--.

Column 13, line 16, change "vale" to --value--.

Column 11, line 42, change "TPDH" TO --TPD--.

Column 14, line 7, change "rotine" to --routine--.

Column 14, line 21, change "chose" to --chosen--.

Column 15, line 60, change "con, non" to --common--.

Signed and Sealed this

Twenty-third Day of May, 1995

Attest:

Attesting Officer

BRUCE LEHMAN

Commissioner of Patents and Trademarks